United States Patent Office 3,423,011
Patented Jan. 21, 1969

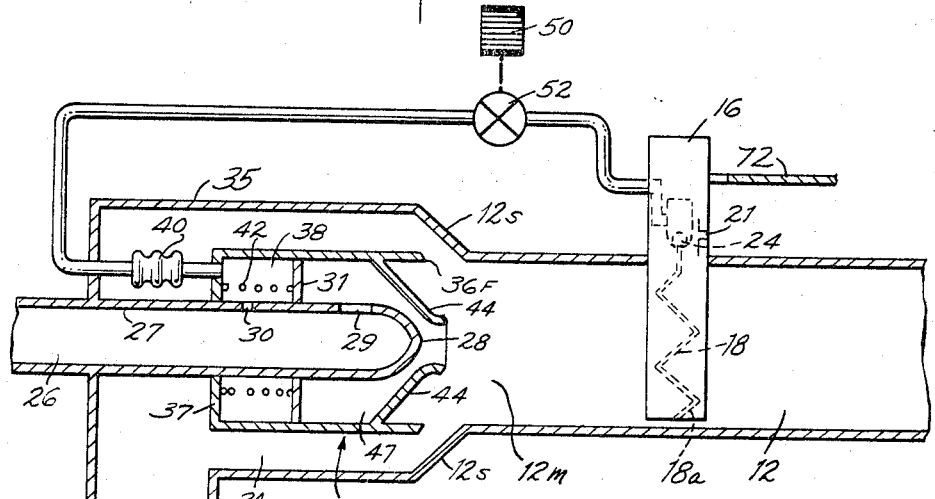
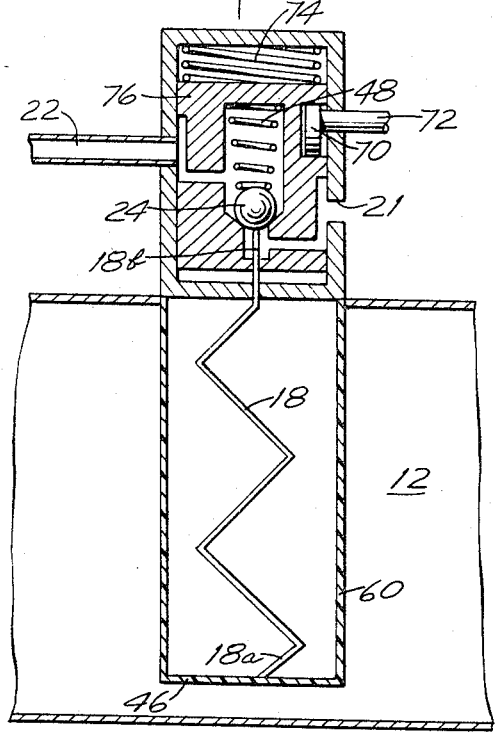
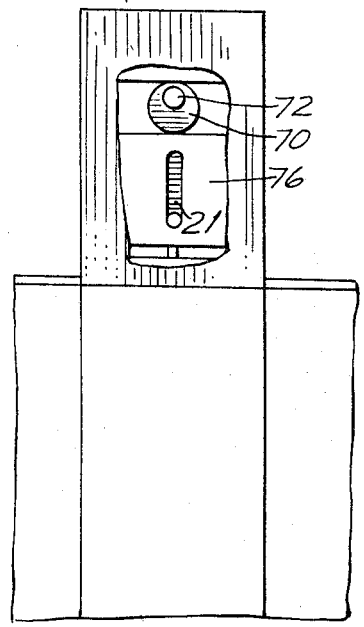

3,423,011
JET PUMP
Thomas B. Stepp, Keller, Tex., assignor to Bell Aerospace Corporation, Wheatfield, N.Y., a corporation of Delaware
Filed Jan. 10, 1967, Ser. No. 608,376
U.S. Cl. 230—112    8 Claims
Int. Cl. F04f 5/48

ABSTRACT OF THE DISCLOSURE

A jet pump wherein a valving arrangement is placed in the nozzle of the jet so that the volume of fluid passing through the jet can be controlled without affecting the pressure, and thus without affecting the velocity of the fluid passing through the jet. The efficiency of the jet pump is maintained in that a decrease in flow through the nozzle will not result in a decrease in jet velocity and thus will not result in a disproportionate decrease of secondary flow. As the primary flow decreases, the secondary flow decreases proportionately so that their ratio will remain constant and thus the efficiency of the jet pump will remain constant. The nozzle valving arrangement is a variable annular orifice that employs the inside wall of the nozzle as an axially movable member whose position determines the orifice opening. The extent of orifice opening determines the mass flow rate but does not affect the velocity of the hot bleed air at the output of the nozzle.

Specification

This invention relates in general to an improved jet pump design and more particularly to an improved valving and ducting arrangement for automatically mixing the required proportions of two fluids to provide the desired fluid mixture.

This invention has particular applicability to the heating of the cabin of an aircraft wherein engine bleed air (hot air) and ambient air (cool air) is mixed to provide a flow of warmer air for maintaining the cabin at a desired temperature. Although, the invention has a broader application than this particular use, this application will describe the invention as adapted to the heating of the pilot's cabin in an aircraft.

This invention employs a novel valving arrangement for mixing hot bleed air from the engine with cooler ambient air to heat the pilot's cabin. It has been known to mix bleed air and ambient air in order to heat the pilot's cabin but the prior techniques of valving and mixing the hot and cool air have had certain limitations and inefficiencies.

In previously known aircraft heating systems where bleed air and ambient air are mixed, a major problem was in the difficulty of controlling the cabin temperature. In one type of known system, separately controlled butterfly valves are placed in the bleed air line and in the ambient air line. The pilot controls the setting of the butterfly valve in the bleed air line. The setting of the butterfly valve in the ambient air line is determined by a temperature responsive controller in the duct where bleed air and ambient air are mixed. As the mixing duct temperature rises, the controller further opens the ambient air line butterfly valve and as mixing duct temperature falls, the controller further closes the ambient air line butterfly valve.

If the temperature in the cabin is hotter than desired, the pilot further closes the bleed air line butterfly valve thereby constricting the amount of hot bleed air being fed to the mixing duct. Similarly, if the cabin temperature is too cool for the pilot, he would further open the bleed air line butterfly valve to admit more hot bleed air into the mixing duct. In such devices, the pilot directly controls the quantity of hot bleed air.

The problem with the use of a butterfly valve (or, indeed any valve) to control the volume of bleed air is that variations in the position of the butterfly valve affect pressure as well as air flow. The effect on pressure results in a drop in velocity and thus a significant drop in the volume of ambient air sucked in by the flowing hot bleed air. As is known in the art, the result is that the ratio between hot air and ambient air becomes non-optimum.

Accordingly, a major object of this invention is to provide a cabin heating system which will employ hot, engine bleed air and which will over most of its operating range provide an optimum mixture of ambient air with the bleed air.

It is a further object of this invention to provide a system which will maintain a stable temperature and which, therefore, is sensitive to changes in the temperature of the mixed air.

It is another purpose of this invention to provide a system which will operate over a wide range of ambient temperatures and operating conditions to provide adequate warmth for the pilot's cabin.

It is a further specific object of this invention to achieve all of the above purposes while employing engine bleed air, whose temperature may be as high as 500° F., without requiring special ducting materials to withstand the bleed air temperature and also, as a corollary of this, providing a system which is safe for the pilot in that the air ducted to the cabin has a temperature that will not burn or otherwise injure the pilot if it happens to be directly blown onto him.

It is a further purpose of this invention to provide a means for achieving all of the above objectives while permitting a measure of pilot flexibility in selecting the temperature which is comfortable for him and further permitting the pilot to make whatever adjustments are optimum or required for extreme flight conditions.

The above objects are met by the use of a jet pump type of arrangement wherein the hot bleed air is fed through a nozzle under presssure and causes cooler ambient air to be drawn in through the duct surrounding the nozzle. It is known that the jet pump will lose efficiency as the velocity of the primary flow (the hot bleed air in this case) decreases.

Accordingly, it is a broad purpose of this invention to provide an improved jet pump design wherein the primary flow through the nozzle may be varied without loss of efficiency.

In brief, this invention involves an improved jet pump arrangement for mixing hot bleed air from the engine with cooler ambient air. The hot bleed air is fed through a jet pump nozzle to draw in, through the surrounding duct, cooler ambient air. The hot air and cool air are mixed in a mixing chamber downstream from the nozzle to provide the desired warm air. The warm air is then ducted to the cabin or whatever area is to be heated.

In order to provide control over the temperature of the warm air, a valving arrangement is provided to control the volume of hot bleed air emitted from the nozzle of the jet pump. To assure that the control over the volume of hot bleed air does not result in a substantial drop of pressure or drop in velocity through the nozzle, this valving arrangement is provided within the nozzle. The particular valving arrangement employed in this invention is one wherein the duct that supplies the hot bleed air to the nozzle terminates in a blunt ended nose, which nose is adapted to seat against the inner wall of the nozzle. A side opening in the duct permits hot bleed air to be fed to the nozzle. The nozzle is mounted on an annular side wall that surrounds the duct which brings engine bleed air up to the nozzle. This annular side wall and nozzle are mounted so that they may be moved axially thereby changing the spacing between the inside wall of the nozzle and the blunt nose end of the duct. This annular spacing is in effect a variable orifice which serves to control the volume of hot bleed air that is emitted by the nozzle without substantially affecting the pressure and therefore without substantially affecting the velocity at which the hot bleed air is emitted by the nozzle. In order to achieve this result, the line of contact between the inside wall of the nozzle and front nose of the hot bleed air duct is near the forward portion of the nozzle so that (as long as there is an orifice opening) the nozzle performs as a jet nozzle on the hot bleed air. At the same time, the pressure of the air in the nozzle is unaffected by the valving effect of this variable orifice.

A temperature controller is placed in the main duct at a point past where the mixing occurs so that it reacts to the temperature of the mixed warm air. The temperature controller is so coupled to the axially movable nozzle as to cause the nozzle to retract (thereby closing the orifice and reducing the amount of hot bleed air admitted to the mixing chamber) when the temperature of the mixed warm air in the main duct goes above a predetermined temperature. Correspondingly, when the temperature in the main duct drops below a predetermined temperature, the temperature controller causes the nozzle to advance thereby opening the orifice. A position of the nozzle is achieved wherein the amount of hot bleed air passed by the orifice is whatever is required to cause the mixed warm air at the temperature controller to be at the predetermined temperature level.

There is also a pilot control mechanism for changing the temperature at which the temperature controller operates. One of the significant aspects of this invention is that, under most operating conditions, the amount of hot bleed air that is forced through the nozzle is such that the maximum possible velocity of the hot bleed air is achieved, namely a velocity close to the speed of sound (Mach 1). This velocity of hot bleed air causes a maximum amount of cool ambient air to be drawn in by virtue of the Venturi effect. This maximum amount of ambient air has a mass approximately equal to that of the hot bleed air. This is desirable for many reasons which are described in greater detail below. But among these desirable reasons are the fact that this keeps the temperature of the warm air in the duct sufficiently low so as not to require special heat resistant duct materials and also to assure that the air which is blown directly into the cabin where a pilot may be sitting is at a temperature that is not dangerous to the pilot.

Other objects and purposes of this invention will become apparent from the following detailed description and drawings in which:

FIG. 3 is a view similar to that of FIGS. 1 and 2 showing the nozzle in a typical operating position wherein both hot bleed air and cool ambient air flow into the system and are mixed together to provide a warm air flow;

FIG. 4 is a cross-sectional view of the temperature controller and associated adjustment mechanism; and FIG. 5 is a partial cross-sectional view along the line 5—5 of FIG. 4.

*The structure*

Figure 1:
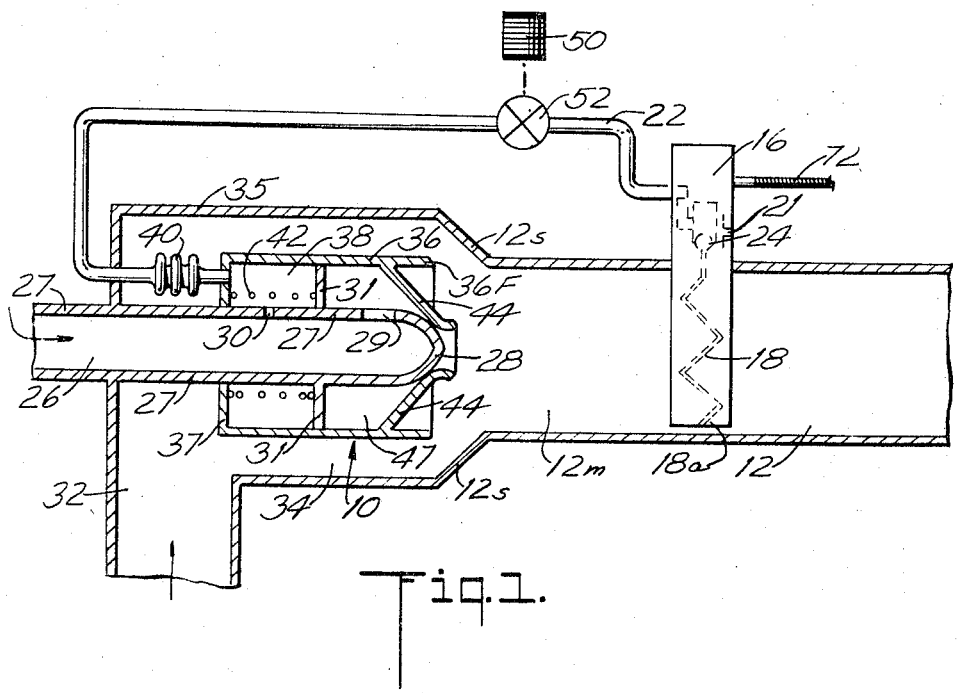
FIG. 1 is a longitudinal cross-sectional schematic view of an embodiment of this invention in which the nozzle is fully retracted to its entirely closed position so that no hot air is passed for heating purposes.

The operation and significance of the valving and ducting arrangement of this invention can best be understood after a brief review of the basic structure that constitutes the invention. The left-hand portion of the embodiment shown in FIGS. 1–3 constitutes a mixing valve arrangement 10 that feeds into a duct 12. The duct 12 leads into the space or cabin to be heated.

The output of the mixing valve 10 normally includes both hot bleed air and cooler ambient air. Thus a stream of hot air and a stream of cool air are both brought into the duct 12 through the mixing valve 10 to be mixed, within the duct 12, thereby providing a stream of warm air. Accordingly, the left-hand portion of the duct 12 is a mixing area 12m in which the cool air and the hot air are mixed together and from which the mixed warm air proceeds downstream, to the right in the figures, to whatever space or cabin is to be heated.

At a position along the duct 12 and no further upstream than the mixing area, a temperature controller 16 is located. A helical bimetallic element 18 portion of the controller 16 is within the duct 12. The bimetallic element 18 is fixed at its bottom end 18a and extends up to a ball valve 24 within the controller 16. As will be explained in greater detail further on in connection with FIGS. 4 and 5, the degree to which the helical bimetallic element 18 is extended or contracted will affect the extent by which the ball valve 24 is opened or closed. This helical element 18 is designed so that it contracts axially as temperature increases and expands axially when its environment cools.

The ball valve 24 when substantially opened operates to connect a vent port 21 to an exhaust line 22. When the ball valve 24 is completely closed (which reflects a contracted condition of the bimetallic element 18 and thus a relatively high temperature condition within the duct 12) the exhaust line 22 and vent 21 are sealed off from one another.

The vent port 21 may conveniently be opened to the outside atmosphere so that when the ball valve 24 is substantially open the pressure in the exhaust line 22 and the associated chamber 38 of the mixing valve 10 will be placed at atmospheric pressure. The purpose for this will be described in detail further on. At this point it is sufficient to note that the temperature responsive bimetallic element 18 determines the position of the ball valve 24 and thus determines the extent of communication between the exhaust line 22 and the vent port 21. At the high temperature extreme, the ball valve 24 is fully seated to completely seal the exhaust line 22 from the vent port 21. At the low temperature extreme, the ball valve 24 is appreciably pushed off its seat by the expanded helical element 18 to place the exhaust line 22 and vent port 21 in full communication with one another.

Intermediate positions of the ball valve 24 can be sustained as a function of the temperature response of the bimetallic element 18. These intermediate positions of the ball valve 24 will provide a constriction between the exhaust line 22 and the vent port 21 thereby providing a pressure drop across the ball valve 24.

The function of the exhaust line 22 is to control the position of the mixing valve 10 and in particular the position of the nozzle 44. This function will be discussed in greater detail after the structural arrangement shown in the figures is more completely described. Suffice it to say now that the purpose of making the valve 20 responsive to the bimetallic element 18 is to ultimately cause the position of the mixing valve 10 to be responsive to the bimetallic element 18 and thus to the temperature within the duct 12.

The mixing valve 10 is fed by two ducts. A first duct 26 is connected to the hot bleed air from the engine. It has a cylindrical side wall 27 that terminates in a closed forward nose 28. The side wall 27 has one port 29 with a cross-sectional area preferably at least equal to the cross-sectional area of the duct 26 so that the port 29 does not act as a constriction. The side wall 27 also contains an orifice 30 that is a constriction and serves to slowly bleed out engine bleed air under pressure into a chamber 38. The reasons for the orifice 30 are best understood in connection with the description of the function and operation of this invention.

Between the port 29 and the orifice 30, an annular flange 31 is connected to and extends radially outward from the side wall 27.

The second duct 32 is connected to ambient air and may be placed in communication with the main duct 12 through an annular duct 34. As may be seen from FIG. 2, there is one extreme position of the mixing valve 10 which seals off the ambient air duct 34 from the main duct 12. The outer side wall 35 of the annular duct 34 and the side wall 27 of the inner duct 26 are stationary relative to the main duct 12 and indeed, in general stationary relative to the fuselage of the aircraft. However, the inner side wall 36 of the annular duct 34 is mounted so as to be axially movable between the two extreme positions shown in FIGS. 1 and 2.

The movable cylindrical side wall 36 is mounted relative to the flange 31 such that their relationship is similar to that between a piston and side wall, except that in the embodiment shown, the cylinder (i.e. the side wall 36) moves while the piston (i.e. the flange 31) remains stationary. An end wall 37 is connected to the movable side wall 36 and extends radially inward to slideably contact the cylindrical side wall 27 thereby forming an annular chamber 38 around the hot air duct 26. The chamber 38 communicates to the port 26 through the orifice 30 at all positions of the movable side wall 36. The diameter of the orifice 30 is small enough so that when there is a differential pressure between the hot air duct 26 and the chamber 38, there will be a substantial time lag before this differential pressure is equalized.

The chamber 38 communicates directly to the exhaust line 22. A bellows 40 in the exhaust line 22 is included to permit the movable side wall 36, end wall 37 and nozzle 44 to move axially between the extreme positions shown in FIGS. 1 and 2. A light spring 42 under compression in the chamber 38 tends to maintain the movable side wall (and thus the entire valve 10) in the state shown in FIG. 1. As will be described hereinafter, certain pressure conditions across the flange 31 overcome the effect of the spring 42 when this mixing valve 10 is in operation.

A nozzle 44 is connected at its base to the side wall 36 to move with the side wall 36. The nozzle 44 is adapted to seat and seal on the front nose portion 38 of the duct 26. When the side wall 36 is in the retracted position shown in FIG. 1, the nozzle 44 seats on the nose 28 along a line of contact forward from the port 29, thereby "closing" the valve 10 and keeping all the bleed air out of the duct 12. Thus from the point of view of providing heat to the cabin, the FIG. 1 position is the off state of the embodiment shown.

Figure 2:
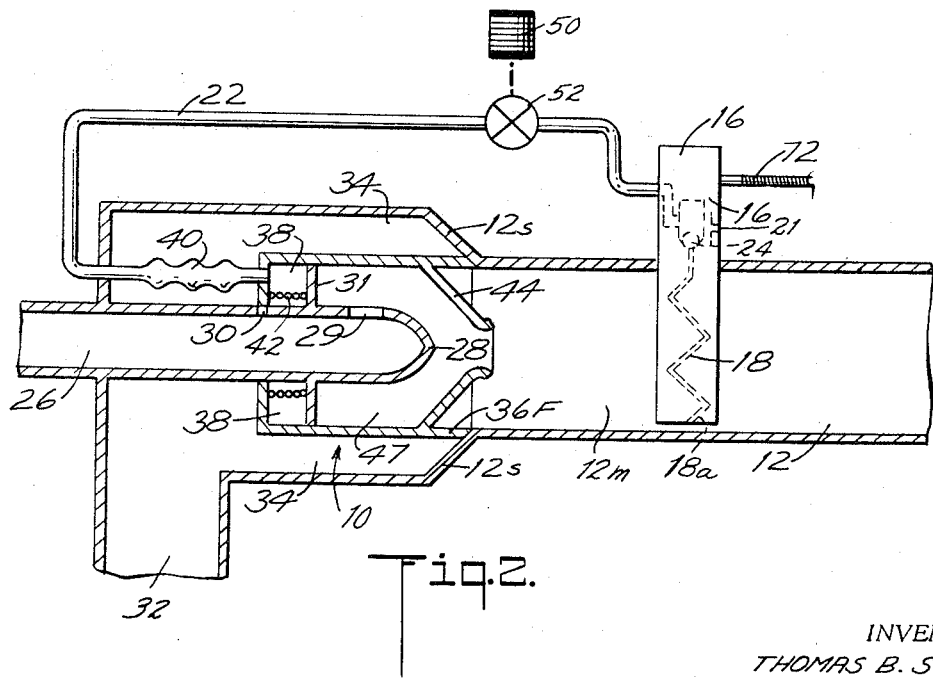
FIG. 2 is a view similar to that of FIG. 1 except that the nozzle is fully extended to its entirely open position so that only hot air is passed for heating purposes; all ambient air being shut off from the mixing chamber and main duct.

When the side wall 36 is in the extreme forward position, shown in FIG. 2, the front end 36f of the wall 36 seats against a set-back 12s in the duct 12 to seal off ambient air from the duct 12. Thus the FIG. 2 position might be termed the fully "on" or "open" state of the embodiment shown since the air being fed to the duct 12 is pure engine bleed air and thus at maximum temperature.

Under normal operating conditions neither the closed FIG. 1 state nor the entirely opened FIG. 2 state are attained. FIG. 3 shows the typical operating condition in which the nozzle 44 is closely spaced from the nose 28 so as to provide a constriction between the chamber 47 and the duct 12 thereby controlling and limiting the amount of hot bleed air that is admitted to the duct 12. At the same time, the forward portion 36f of the movable side wall 36 is sufficiently far removed from the set-back 12s in the duct 12 so as to permit a substantial amount of ambient air to be drawn into the duct 12 by virtue of the fact that a fast flowing fluid (in this case hot bleed air) will draw in fluid from any source that is fed to the periphery of the stream of fluid. This is the known jet pump type of operation.

FIGS. 4 and 5 show the detailed structure of a temperature controller 16 that may be employed in the embodiment of this invention described above. FIG. 4 shows the ball valve 24 completely closed so that the exhaust line 22 and the vent port 21 are sealed off from one another. The bimetallic element 18 is fixed at one end 18a to the controller wall 46. The upper end 18b of the bimetallic element 18 is positioned to contact the ball valve 24. As the temperature environment drops and the bimetallic element 18 expands, the ball valve 24 is forced upward against the weak compression spring 48 thereby placing the exhaust line 22 in communication with the vent port 21. The hotter the air in the duct 12, the more will the bimetallic element 18 contract, and the greater will be the pressure drop across the ball valve 24.

Thus at the extreme position that reflects a relatively low temperature, there will be full communication between the exhaust line 22 and the vent port 21 so that the pressure in the chamber 38 will be dropped to atmospheric. With the chamber 38 pressure at a minimum, the hot bleed air pressure in the chamber 47 will force the nozzle 44 forward to the extreme open position shown in FIG. 2. Correspondingly, at the extreme position that reflects a relatively high temperature in the duct 12, the exhaust line 22 will be sealed off from the vent port 21 and the pressure in the chamber 38 will gradually rise by virtue of the hot bleed air bleeding across the constriction 30. When the chamber 38 pressure has risen to that of the bleed air in the duct 26 and chamber 47, the pressure differential across the flange 31 will be zero and the compression spring 42 will move the nozzle 44 into the extreme closed position shown in FIG. 1.

As may be seen from FIGS. 4 and 5, provision is made so that the pilot can adjust the predetermined temperature at which the controller 16 operates. This is achieved by means of a camming arrangement consisting of a disc 70 and a rotatable shaft 72 which is connected to the face of the disc 70 off center of the disc 70. The shaft 72 is mechanically coupled to a dial convenient to the pilot. The rotation of the off center shaft 72 positions the disc 70 in a fashion that effects the vertical position of the spring 74 loaded movable head unit 76. The positions shown in FIGS. 4 and 5 is the extreme downward position of the head unit 76. Rotation of the shaft 72 in either direction from the position shown in FIGS. 4 and 5 will lift the head unit 76 against the compression spring 74 so as to position it a bit higher than is shown in the two figures. When positioned a bit higher than is shown, the ball 24 is lifted up slightly by the head unit 76 so that the ball valve 24 will start to open at a minimum predetermined temperature that is higher than the minimum temperature required to start the ball valve opening under the cam 70, 72 position shown in FIGS. 4 and 5.

*Operation*

With the above structural arrangement in mind, the operation of this invention can readily be understood.

The normal operating state of the valve 10 is intermediate between the entirely closed state shown in FIG. 1 and the entirely open state shown in FIG. 2. This normal operating state is shown in FIG. 3. The entirely closed state of the valve shown in FIG. 1, might be considered the normal position of the valve 10 with the engine turned off or with a valve as an on the shelf item. This unenergized entirely closed state of the valve 10 is established by the compression spring 42 which, absent a differential pressure across the flange 31, will cause the valve 10 to attain the state shown in FIG. 1. The FIG. 1 state is called herein the closed state because in the FIG. 1 position the nose 28 is seated on a forward portion of the nozzle 44 so that no hot, engine bleed air is admitted into the mixing area of the duct 12.

The FIG. 2 state of the mixing valve 10 is the fully open state. In the FIG. 2 state, only hot air from the duct 26 is admitted to the mixing area 12m of the duct 12 and, because of the sealing between of the forward portion 36f of the inner side wall 36 and the setback 12s in the duct 12 wall, the duct 32 is completely sealed off from the mixing area of the duct 12. Thus no ambient air is admitted to the duct 12 when the valve 10 is fully open.

The normal operating state of the valve is between FIGS. 1 and 2, such as the position shown in FIG. 3. In the normal operating state, the nozzle 44 has moved forward a small amount so as to provide a constriction between the nose 28 and the nozzle 44 that will serve to control the amount of bleed air under pressure that flows from the chamber 47 into the duct 12. This normal operating condition is described in somewhat greater detail after the following description of the two conditions which create the extreme condition shown in FIGS. 1 and 2.

Assume as a starting point the FIG. 1 closed state. This fully closed state can be achieved by actuating the solenoid 50 so as to close the shut off valve 52 in the exhaust line 22. With the exhaust line 22 closed, the hot bleed air will soon build up sufficient pressure in the chamber 38 so as to assure the closing of the valve 10. Once the valve 10 closes, it is true that the bleed air pressure in the chamber 47 will equal the pressure built up in the chamber 38. However, the compression spring 42 will serve to keep the valve 10 closed.

Assume next that the solenoid 50 is turned on by the pilot so as to open the shut off valve 52 and thereby open the exhaust line 22. If the duct 12 condition in the vicinity of the bimetallic element 18 is cold then the bimetallic element 18 will expand axially to push the ball valve 24 from its seat in unit 76 thereby placing the exhaust line 22 in full communication with the vent port 21. As a consequence, the pressure in the chamber 38 will drop to atmospheric pressure. As long as the ball valve 24 remains substantially removed from its seat in the valve 20, the pressure in the chamber 38 will stay down at atmospheric pressure since the constriction 30 is small compared to the cross-sectional area of the exhaust line 22. Thus the bleed air which is admitted into the chamber 38 across the constriction 30 will immediately be exhausted through the line 22 and vent 21. With a drop in pressure in the chamber 38, the relatively greater pressure of the bleed air in the chamber 47 will cause the nozzle 44 to move forward (that is, to the right in the figures). Under the condition where the ball valve 24 is sufficiently removed from its seat so that there is no constriction between the exhaust line 22 and the vent line 21 (so that pressure cannot build up in the chamber 38), the bleed air pressure will be sufficient to move the nozzle 44 all the way forward to the entirely opened FIG. 2 state.

Normally, the FIG. 2 state will provide much too hot an air temperature in the duct 12. The 500° F. bleed air temperature is simply hotter than the duct materials are normally designed to take. In addition, it is most undesirable that air at such temperature be emitted directly into the cabin. Air at 500° F., as it comes out of a heating vent can cause skin burns. Thus the controller 16 is set so that the bimetallic element 18 will contract at a predetermined high limit temperature to seat the ball valve 24 and thus shut off the exhaust line 22. With the exhaust line 22 shut off, bleed air will gradually bleed across the constriction 30 and build up pressure in the chamber 38 to a point where the pressure in the chamber 38 will retract the nozzle 44, thereby tending to close the valve 10.

Depending upon the dynamics of the particular design and situation, the valve 10 may not close entirely. The valve 10 will, however, normally tend to close until the duct 12 temperature drops to a point where the bimetallic element 18 starts to push the ball valve 24 off its seat. In any case, after a few cycles, the position of the nozzle 44 tends to stabilize to provide very close to a level duct 12 temperature. In one embodiment that has been built and tested, the temperature variation downstream from the bimetallic element 18 could not be observed with a thermocouple.

The condition wherein a stable temperature is attained, is one that involves a balance between: (1) the spring 42 which tends to close the valve 10, (2) the pressure in the chamber 38 which pressure tends to close the valve 10, and (3) the pressure in the chamber 47 which tends to open the valve 10.

The magnitude of the pressure in the chamber 38 is determined by the extent the ball valve 24 is off its seat. Under normal operating conditions, the ball valve 24 will be off its seat enough so that constricted flow will occur between the exhaust line 22 and the vent port 21. This constricted flow around the ball valve 24 will be matched under the stable operating condition by the constricted flow across the constriction 30 to establish a fairly stable pressure in the chamber 38.

The pressure in the chamber 47 will be determined by the opening between the nose 28 and the nozzle 44. Constricted flow through this opening will determine the pressure in the chamber 47.

Assume that the normal operating condition for the mixing valve 10 has been attained for a given cabin temperature. If the pilot wants the cabin a little warmer, he will adjust the cam arrangement 70, 72 to lower the head unit 76 so that the constriction between line 22 and vent 21 will be lessened (that is, the pressure in the line 22 and chamber 38 will drop). A drop in the pressure within the chamber 38 will mean that the pressure in the chamber 47 is unbalanced. Thus the relatively higher pressure in the chamber 47 will cause the nozzle 44 to move to the right thereby opening the valve 10 a bit more. The consequent increased space between the nose 28 and the nozzle 44 will mean less of a drop across the constriction formed between these two members 28 and 44. Thus the pressure of the chamber 47 will drop tending to match the drop in pressure in the chamber 38. A new balance will ultimately be struck. Under this new balanced condition a greater volume of hot bleed air will be admitted through the nozzle 44 so that the temperature of the cabin will increase.

The pilot will soon learn what setting of the dial attached to the flexible shaft 72 will provide satisfactory cabin temperature for him under various flight and ambient air conditions.

The solenoid 50 is pilot controllable so that he can turn off the solenoid 50 and thus close the shut-off valve 52 when he wishes in order to shut off the exhaust line 22 and thus close the valve 10. There are certain flight conditions when the maximum power for the motor is needed. It is then desirable to stop the use of bleed air for heating purposes so as to divert as little energy from the motor as is possible. Under such flight conditions, the pilot can thus throw a switch that will then close the valve 10 and eliminate the strain on motor power.

It is practical and even desirable, to mount the bimetallic element 18 in the duct 12 substantially downstream from the nozzle 44. Five feet or more downstream will usually be adequate.

Except for those conditions where the valve 10 is nearly opened or nearly closed, the nozzle 44 design is such that the bleed air is emitted into the duct 12 at maximum possible velocity, namely a velocity nearly the speed of sound. At such a Mach 1 velocity, the volume of ambient air drawn in through the duct 32 to be mixed with the hot bleed air in the duct 12 will be at a maximum, which maximum is a weight of air approximately equal to the weight of the bleed air being emitted into the duct 12. Thus equal weights of ambient air and bleed air are mixed in the duct 12 under most operating conditions of the valve 10. This maximum efficiency operating point is desirable operation for the heating system of this invention for a number of reasons.

First, it is desirable that the maximum amount of ambient air be drawn in as is possible to keep the temperature of the air in the duct 12 down as much as is possible. The plastic materials which it is economical to use in the duct 12 will not adequately withstand the full bleed air temperatures of 500° F. The more ambient air that is mixed in with the bleed air, the lower will be the temperature in the duct 12 and this permits a wider selection among materials for fabricating the duct 12.

The second important reason for keeping the temperature of the air in the duct 12 to a minimum is that it is dangerous for the cabin passengers to have hot air directly admitted into the cabin. If the design is to avoid further expensive and complicated air circulating techniques or the use of some sort of radiator, it is desirable that a maximum amount of ambient air be drawn in to be mixed with the bleed air in order to keep the temperature of the air emitted from the duct 12 into the cabin at a minimum.

A third reason for desiring a maximum flow of ambient air is that this means a maximum flow of warming air. The greater the flow of warming air the more readily will temperature in the cabin be stabilized. If the flow of warming air were low then it would take a long time for the cabin to warm up when the cabin temperature is low or has dropped.

A most important feature of this invention is in the location of the valve arrangement which controls the amount of hot bleed air that passes through the nozzle 44. It is extremely important that this valve arrangement be positioned within the nozzle 44. This placement is achieved by means of the nose 28 of the duct 27 being positioned to cooperate with the nozzle wall 44 in such a fashion that the space between the closed front end 28 and the nozzle wall 44 is the valve for regulating the flow of hot bleed air.

The arrangement described of a nozzle 44 through which a first fluid is forced at a high pressure and at a high flow rate in order to draw in a second fluid into a mixing area downstream of the nozzle 44 is called a jet pump. In all jet pump arrangements the efficiency of the pump is a function of the velocity of the first fluid; that is the fluid flowing through the nozzle 44. The higher the velocity of the first fluid from the nozzle 44, the greater will be the mass of the second fluid drawn through the surrounding duct 34. In a jet pump, the maximum practical flow through the nozzle 44 is approximately Mach 1. At a nozzle 44 fluid flow rate of Mach 1, the maximum amount of the second fluid will be drawn into the mixing area of the duct 12. This maximum amount of the second fluid has a mass flow nearly equal to the mass flow of the first fluid. If the flow rate of the first fluid from the nozzle 44 decreases, not only does the flow rate of the second fluid (the fluid that is drawn in) decrease but the mass flow of the second fluid becomes less than the mass flow of the first fluid. In effect, the efficiency of the jet pump drops. For most situations where a jet pump is employed, it is obviously undesirable to lose efficiency and thus every effort is made to operate at maximum flow rates for the first fluid.

If the valving arrangement that controls the amount of hot bleed air were placed further upstream in the duct 26, the result would be that the pressure would drop downstream of the valve. The more the valve was closed, the more the pressure would drop in the duct 26 downstream of the valve. Because of the reduction of pressure downstream of the valve, the fluid velocity through the nozzle 44 would be reduced with the above mentioned undesirable consequences. One of the most important features of this invention is in providing a valve arrangement for regulating the flow of hot bleed air through a jet nozzle 44 that does not appreciably reduce the pressure in the nozzle 44. This result is achieved by having the valve for the hot bleed air in the nozzle 44. By having the nozzle wall 44 movable axially relative to the nose 28, the nozzle wall 44 itself is made an operative element of the hot bleed air regulating valve. Thus maximum velocity out of the nozzle 44 is attained while permitting regulation of the volume of fluid that flows out of the nozzle 44. In this fashion, the jet pump is made efficient over a wide range of mass flow rates.

As a further safety precaution, an overheat switch (not shown) may be maintained downstream of the mixing area in the duct 12. This overheat switch is coupled to the shut-off valve solenoid 50 so that if the temperature in the duct 12 exceeds a predetermined danger point, the valve 52 is closed and as a consequence, for the reason described above, the mixing valve 10 closes and all hot air to the duct is shut off. This overheat switch is solely a safety device and under normal operating conditions the temperature in the duct 12 will not reach a temperature at which the overheat switch is set to respond to.

As has been mentioned above, the normal 500° F. temperature from the bleed air line is so high that it would damage the materials out of which it is desirable to make the duct 12. It would also be dangerous for the pilot to directly let such hot air into the cabin. Thus, at first glance, the entirely open condition in FIG. 2 should appear to be undesirable. However, the mixing valve 10 is designed to provide the FIG. 2 condition in which all ambient air is shut off by the forward end 36f of the movable side walls 36. The reason for this design is that under flight idle conditions the air in the motor is not compressed as much by the engine as is otherwise the case and the bleed air provided might have a temperature as low as 165° F. If the ambient temperature is, say 0° F., then the pilot may well want the bleed air unmixed with ambient air. Thus the embodiment that is illustrated through this invention has the potentiality for the extreme completely open position shown in FIG. 2.

With the above understanding of the normal operating condition of this invention in mind, it might be of some value to briefly reiterate those operating conditions under which one of the two extreme positions (that is, the FIG. 1 position and the FIG. 2 position) of the mixing valve 10 might be obtained and desirable.

As mentioned above, a main reason for wanting the extreme closed condition shown in FIG. 1 is under those flight conditions which impose a maximum strain on the engine. Under such conditions, one does not wish to divert any energy from the engine and it is desirable for the pilot to affect the state of the solenoid 50 so as to close the shut off valve 52 and thereby assure that the fully closed position of the mixing valve 10 is achieved. This prevents bleed air, and thus engine energy, from being diverted to heating. Of course, whenever the cabin is warmer than desired, the pilot will want the mixing valve 10 to be closed. Under most circumstances this will be achieved by virtue of the fact that the bimetallic element 18 will have contracted sufficiently so that the ball valve 24 will have dropped to the point where the line 22 is sealed off from the vent 21. For the reasons described above this will close the mixing valve 10 completely. However, if the ball valve 24 setting is such that it does not shut completely at a temperature level which the pilot feels is as high as he wants and if he finds that the adjustment of the camming arrangements 70, 72 will not shut off the heating system, he then can turn off the solenoid 50 so as to close the shut off valve 52 and thereby close the mixing valve 10.

Under most flight conditions the FIG. 2 extreme position would be most undesirable and would permit very hot bleed air (perhaps 500° F.) to be admitted into the duct 12 with the result that it might be dangerous to the duct 12 as well as to the occupants of the cabin that is being heated. The temperature controller 16 should be designed to prevent the FIG. 2 condition from occurring whenever the temperature in the duct 12 is above a certain predetermined level. Indeed, at above at least one predetermined temperature level, the controller 12 should be designed so that the mixing valve 10 closes. However, there may be an idling motor condition where the engine bleed air temperature is relatively low and the ambient temperature is so cold that the pilot wants and can tolerate the bleed air by itself.

This invention has been described in connection with the particular application of heating the cabin of an aircraft. It should be kept in mind that the invention can be employed for other purposes. As a related example, the invention has application in the air conditioning (that is cooling) of an aircraft cabin. Cooling is frequently achieved by using hot engine bleed air to power a turbine. The turbine in turn operates the air conditioning system. The turbine efficiency requires a maximum bleed air velocity. The device of this invention can be employed to maintain the maximum bleed air velocity over the specific operating range.

It should also be kept in mind that this invention can be used for regulating fluid flow as well as for air or gaseous flow. The fluid flow principles are essentially the same.

Accordingly, in broadest terms this invention is an improvement in jet pump design.

What is claimed is:

1. In a jet pump for supplying a first fluid through a nozzle to induce a second fluid to flow into a mixing area downstream of the jet nozzle, the improvement comprising:
    (a) a first duct having an input end adapted to receive said first fluid and an output port positioned to supply said first fluid to said nozzle,
    (b) said first duct and said nozzle being mounted movable relative to one another along the axis of said nozzle,
    (c) said first duct having a closed forward end adapted to seat on the inside wall of said nozzle, said output port of said first duct being upstream of the line of contact between said first duct and said nozzle when seated together, whereby the spacing between said nozzle and said forward end of said first duct may be adjusted to adjust the mass flow rate of said first fluid through said nozzle,
    (d) valve means downstream of said jet pump, the valving position of said valve means being responsive to a parameter related to the relative amounts of said first fluid and of said second fluid,
    (e) a chamber having a first outlet in communication with said valve means, whereby the position of said valve means will determine the extent to which said chamber is in communication with an outside environment,
    (f) an orifice constriction between said chamber and said first duct, whereby fluid from said first duct under the pressure in said first duct will bleed through said restriction into said chamber and whereby the pressure in said chamber will be a function of the extent to which said valve means is open, and
    (g) positioning means for positioning said first duct and said nozzle relative to one another in a direction along the axis of said nozzle, said positioning means being responsive to the pressure in said chamber, whereby the position of said first duct and said nozzle relative to one another will be a function of the pressure in said chamber.

2. The jet pump improvement of claim 1 in which said chamber and said positioning means comprise:
    (h) a side wall to which the base of said nozzle is attached, said side wall radially outboard and spaced from said first duct,
    (i) an end wall at the upstream end of said side wall, said end wall extending radially inward to be in sliding-sealing relationship with said first duct,
    (j) an outwardly extending flange attached to said first duct upstream of said output port of said first duct and downstream of said end wall, said flange being in sliding-sealing relationship with said side wall; said side wall, said end wall, the wall of said first duct, and said flange defining said chamber around said duct,
    (k) said wall of said first duct including said orifice therethrough for communication between said duct and said chamber,
    (l) an exhaust line having a first end in communication with said chamber,
    (m) expansible means in said exhaust line, whereby said side wall together with said end wall and said nozzle are free to move axially relative to the axis of said nozzle to vary said spacing between said nozzle and said forward end of said first duct, and
    (n) spring means within said chamber tending to push said flange and said end wall apart, thereby tending to close said nozzle against said forward end of said first duct when the pressures on the two sides of said flange are substantially equal,
    (o) said valve means being connected to a second end of said exhaust line to control communication between said exhaust line and said outside environment as a function of the position of said valve means and thus as a function of the relative amounts of said first and of said second fluid in the area, downstream of said nozzle, where said valve means is coupled.

3. The improvement of claim 2 further characterized by:
    (p) a second duct for a flow of said second fluid therethrough, said second duct radially outboard and spaced from said side wall, and
    (q) a forward extension of said side wall adapted to seat against the wall of said second duct when said spacing between said nozzle and said forward end of said first duct is open to a predetermined amount, thereby sealing off the flow of said second fluid to the mixing area downstream of the jet nozzle when said spacing has been opened by said predetermined amount.

4. The jet pump improvement of claim 2 adapted to heat the cabin of an aircraft or the like, further characterized by:
    (p) said first duct being connected to engine bleed air, and
    (q) a second duct outboard of said side wall for the secondary flow of fluid, said second duct having an inlet connected to ambient air.

5. In a system employing a jet pump for mixing engine bleed air with ambient air in order to heat the cabin of an aircraft or the like wherein the jet pump has a nozzle for the flow of primary fluid and a first inlet duct surrounding said nozzle for the flow of secodnary fluid, said first duct being adapted to be coupled to the ambient air, the improvement of a valve and controller arrangement comprising:
    (a) a second inlet duct having an input end adapted to be coupled to the engine bleed air, said second duct having a closed forward end adapted to seat on the inside wall of said nozzle, said second duct having an output port upstream of the line of contact between said second duct and said nozzle when seated together, whereby engine bleed air is supplied as the primary fluid to said nozzle,
    (b) said second duct and said nozzle being mounted movable relative to one another along the axis of said nozzle to provide a variable annular spacing between said duct and said nozzle,
    (c) a temperature controller downstream of said jet pump, said controller including a thermostat, the position of said thermostat being a function of the temperature of the mixed ambient and bleed air,
    (d) a side wall to which the base of said nozzle is attached, said side wall surrounding and spaced from said second duct, (e) an end wall at the downstream end of said side wall, said end wall extending radially inward to be in sliding-sealing relationship with said second duct, (f) an outwardly extending flange attached to said second duct upstream of said output port of said second duct and downstream of said end wall said flange being in sliding-sealing relationship with said side wall, (g) said side wall, said end wall, the wall of said second duct, and said flange defining a chamber around said second duct, (h) said wall of said second duct including an orifice constriction therethrough for communication between said second duct and said chamber, whereby engine bleed air under pressure will bleed through said orifice constriction into said chamber, (i) an exhaust line having one end in communication with said first chamber, (j) a bellows in said exhaust line, whereby said side wall together with said end wall and said nozzle will be free to move axially relative to the axis of said nozzle so that said spacing between said nozzle and said second duct may be varied, (k) spring means within said chamber tending to push said flange and said end wall apart, thereby tending to close said spacing when the pressures on the two sides of said flange are substantially equal, and (l) a valve in said exhaust line to control communication between said exhaust line and a desired ambient pressure, said valve being responsive to the position of said thermostat, whereby the extent of communication between said exhaust line and thus between said chamber and said desired ambient pressure is determined by the temperature environment of said thermostat.

6. The improvement of claim 5 in which said side wall has a forward extension adapted to seat against the wall of said first inlet duct when said variable orifice is opened to a predetermined amount, thereby sealing off ambient air from the zone downstream of said nozzle when said variable orifice has been opened said predetermined amount.

7. In a system for mixing engine bleed air with ambient air in order to heat the cabin of an aircraft or the like, the improvement of a valve and controller arrangement comprising:

(a) a jet pump having a nozzle and a first duct annular in shape surrounding said nozzle, (b) a second duct having a closed end adapted to seat on the inside wall of said nozzle, said second duct having an output port upstream of said closed forward end whereby hot engine bleed air fed to said second duct will be supplied through said port to said nozzle, said second duct and said nozzle being mounted movable relative to one another along the axis of said nozzle to provide a variable annular orifice between said closed forward end of said duct and said inside wall of said nozzle, (c) a thermostat temperature controller downstream of said jet pump responsive to the temperature of the warm air provided by the mixture of the hot bleed air and cooler ambient air mixed by said jet pump, (d) an annular side wall to which the outer edge of said nozzle is attached, said annular side wall surrounding and spaced from said second duct, (e) an end wall at the downstream end of said annular side wall, said end wall extending radially inward to be in sliding-sealing relationship with said second duct, (f) an outwardly extending flange attached to said second duct upstream of said output port of said second duct and downstream of said end wall, said flange being in sliding-sealing relationship with said annular side wall, (g) said annular side wall, said end wall, the wall of said second duct, and said flange defining an annular chamber around said second duct, (h) said wall of said second duct including a second orifice therethrough for communication between said duct and said annular chamber, whereby engine bleed air under pressure will bleed through said second orifice into said annular chamber, (i) an exhaust line having one end in communication with said first chamber, (j) a bellows in said exhaust line whereby said annular side wall together with said end wall and said nozzle will be free to move axially relative to the axis of said nozzle so that said annular orifice may be varied, (k) spring means within said annular chamber tending to push said flange and said end wall apart thereby tending to close said annular orifice when the pressures on the two sides of said flange are substantially equal, and (l) a valve in said exhaust line to control communication between said exhaust line and a desired ambient pressure, said valve being responsive to the position of said thermostat, whereby the extent of communication between said exhaust line and thus between said annular chamber and said desired ambient pressure is determined by the temperature environment of said thermostat.

8. The improvement of claim 7 in which said annular side wall has a forward extension adapted to seat against the wall of said first duct when said variable orifice is opened to a predetermined amount thereby sealing off ambient air from the zone downstream of said nozzle when said variable orifice has been opened said predetermined amount.

References Cited

UNITED STATES PATENTS

| 1,080,420 | 12/1913 | Clifton | 230—112 |
| 2,085,942 | 7/1937 | Bancel et al. | |
| 2,130,549 | 9/1938 | Kirgan | 230—111 X |
| 2,397,870 | 4/1946 | Kneass | 230—111 X |
| 3,263,702 | 8/1966 | Pullen et al. | 230—112 X |
| 2,676,575 | 4/1954 | Rosenberger | 230—112 X |

FOREIGN PATENTS 20,300   1/1945   Finland.

DONLEY J. STOCKING, *Primary Examiner.*

WARREN J. KRAUSS, *Assistant Examiner.*

U.S. Cl. X.R.

103—272, 274